US009842039B2

(12) United States Patent
Siciliano et al.

(10) Patent No.: US 9,842,039 B2
(45) Date of Patent: Dec. 12, 2017

(54) PREDICTIVE LOAD SCALING FOR SERVICES

(71) Applicant: Microsoft Technology Licensing, LLC, Redmond, WA (US)

(72) Inventors: Stephen Siciliano, Bellevue, WA (US); Charles Lamanna, Bellevue, WA (US); Ilya Grebnov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 779 days.

(21) Appl. No.: 14/307,759

(22) Filed: Jun. 18, 2014

(65) Prior Publication Data

US 2015/0278061 A1 Oct. 1, 2015

Related U.S. Application Data

(60) Provisional application No. 61/972,703, filed on Mar. 31, 2014.

(51) Int. Cl.
*G06F 11/30* (2006.01)
*G06F 11/34* (2006.01)
(Continued)

(52) U.S. Cl.
CPC ........ *G06F 11/3034* (2013.01); *G06F 9/5072* (2013.01); *G06F 9/5083* (2013.01);
(Continued)

(58) Field of Classification Search
CPC .. G06F 9/5072; G06F 9/5083; G06F 11/3034; G06F 11/3419; G06F 2209/5019;
(Continued)

(56) References Cited

U.S. PATENT DOCUMENTS 7,743,001 B1 * 6/2010 Vermeulen ............. G06Q 30/02
705/400
8,028,051 B2 * 9/2011 Hasegawa ............. G06F 9/5011
709/205
(Continued)

FOREIGN PATENT DOCUMENTS

| EP | 2381363 | 10/2011 |
| EP | 2624138 A2 | 8/2013 |
| WO | 2014047073 A1 | 3/2014 |

OTHER PUBLICATIONS

Office Action dated Sep. 13, 2016 cited in U.S. Appl. No. 14/307,745.

(Continued)

*Primary Examiner* — Patrice Winder
(74) *Attorney, Agent, or Firm* — Workman Nydegger (57) ABSTRACT

Embodiments are directed to determining an optimal number of concurrently running cloud resource instances and to providing an interactive interface that shows projected operational metric measurements. In one scenario, a computer system accesses metric information which identifies operational metric measurements, and further accesses a second portion of metric information that identifies operational metric measurements for the cloud resource instances over a second period of time. The computer system then calculates projected operational metric measurements based on the identified operational metric measurements over the first period of time (e.g. for reactive tuning) and further based on the identified operational metric measurements over the second period of time (e.g. for predictive tuning). The computer system then determines, based on the projected operational metric measurements, a number of cloud resource instances that are to be concurrently running at a specified future point in time.

20 Claims, 6 Drawing Sheets (51) Int. Cl.
  *H04L 12/24* (2006.01)
  *H04L 12/26* (2006.01)
  *H04L 12/923* (2013.01)
  *G06F 9/50* (2006.01)

(52) U.S. Cl.
  CPC ........ *G06F 11/3419* (2013.01); *H04L 41/147* (2013.01); *H04L 41/5054* (2013.01); *H04L 43/08* (2013.01); *H04L 47/762* (2013.01); *G06F 2209/5019* (2013.01)

(58) Field of Classification Search
  CPC ... H04L 41/147; H04L 41/5054; H04L 43/08; H04L 47/762
  See application file for complete search history.

(56) References Cited

U.S. PATENT DOCUMENTS

| | | | |
|---|---|---|---|
| 8,286,165 B2 | 10/2012 | Miyata | |
| 8,296,434 B1 | 10/2012 | Miller et al. | |
| 8,380,880 B2* | 2/2013 | Gulley | G06F 9/5027 709/217 |
| 8,499,066 B1 | 7/2013 | Zhang et al. | |
| 8,572,612 B2 | 10/2013 | Kern | |
| 8,589,549 B1* | 11/2013 | Vermeulen | G06F 9/50 709/226 |
| 8,606,897 B2* | 12/2013 | Ferris | G06Q 10/00 705/80 |
| 8,661,182 B2 | 2/2014 | Behera et al. | |
| 8,756,610 B2* | 6/2014 | Dasgupta | G06F 9/5072 718/104 |
| 8,806,501 B2* | 8/2014 | Fong | G06F 9/5061 709/223 |
| 9,110,728 B2 | 8/2015 | Shen et al. | |
| 9,207,984 B2* | 12/2015 | Sivasubramanian | G06F 9/5016 |
| 9,306,870 B1* | 4/2016 | Klein | H04L 29/06176 |
| 2005/0044228 A1 | 2/2005 | Birkestrand et al. | |
| 2005/0086029 A1 | 4/2005 | Cascaval et al. | |
| 2008/0172671 A1* | 7/2008 | Bouillet | G06F 11/3476 718/104 |
| 2010/0332643 A1 | 12/2010 | Benari | |
| 2011/0078303 A1 | 3/2011 | Li et al. | |
| 2012/0173709 A1 | 7/2012 | Li et al. | |
| 2012/0204186 A1* | 8/2012 | Davidson, II | G06F 9/5077 718/104 |
| 2012/0254443 A1 | 10/2012 | Ueda | |
| 2012/0260019 A1 | 10/2012 | Malaiyandisamy et al. | |
| 2012/0324092 A1 | 12/2012 | Brown et al. | |
| 2013/0007753 A1 | 1/2013 | Jain | |
| 2013/0086273 A1 | 4/2013 | Wray et al. | |
| 2013/0318527 A1* | 11/2013 | Tamura | G06F 9/5072 718/1 |
| 2013/0346614 A1 | 12/2013 | Baughman et al. | |
| 2014/0040885 A1 | 2/2014 | Donahue | |
| 2014/0082165 A1 | 3/2014 | Marr et al. | |
| 2014/0310401 A1 | 10/2014 | Thomas | |
| 2015/0113120 A1* | 4/2015 | Jacobson | G06N 5/04 709/224 |
| 2015/0281113 A1 | 10/2015 | Siciliano et al. | |

OTHER PUBLICATIONS

U.S. Appl. No. 61/972,706, filed Mar. 31, 2014, Siciliano et al.
Mao, et al., "Cloud Auto-scaling with Deadline and Budget Constraints", In 11th IEEE/ACM International Conference on Grid Computing (GRID), Oct. 25, 2010, 8 pages.
Keagle, Charles, "AWS Auto-Scaling", Available at least as early as Mar. 21, 2014. Available at <<http://2ndwatch.com/aws-auto-scaling/>>.
"International Search Report and Written Opinion Issued in PCT Application No. PCT/US2015/022604", dated Jun. 18, 2015, 12 pages.
"International Preliminary Report on Patentability Issued in PCT Application No. PCT/US2015/022604", dated Feb. 11, 2016, 7 pages.
"Second Written Opinion Issued in PCT Application No. PCT/US2015/022605", dated Apr. 28, 2016, 6 Pages.
Yuan, et al., "Scryer: Netflix's Predictive Auto Scaling Engine—Part 2", Published on: Dec. 4, 2013, Available at: http://techblog.netflix.com/2013/12/scryer-netflixs-predictive-auto-scaling.html.
"How to Scale an Application", Published on: Jan. 22, 2014, Available at: http://www.windowsazure.com/en-us/documentation/articles/cloud-services-how-to-scale/.
Gandhi, et al., "AutoScale: Dynamic, Robust Capacity Management for Multi-Tier Data Centers", In Journal of ACM Transactions on Computer Systems, vol. 30, Issue 4, Apr. 2012, 31 pages.
Ramesh, et al., "Project Hoover: Auto-Scaling Streaming Map-Reduce Applications", In Proceedings of the Workshop on Management of Big Data Systems, Sep. 21, 2012, 7 pages.
"International Preliminary Report on Patentability Issued in PCT Application No. PCT/US2015/022605", dated Jul. 19, 2016, 7 Pages.
"International Search Report and Written Opinion Issued in PCT Application No. PCT/US2015/022605", dated Jun. 22, 2015, 11 Pages.
Notice of Allowance dated Mar. 28, 2017 cited in U.S. Appl. No. 14/307,745.

* cited by examiner

PREDICTIVE LOAD SCALING FOR SERVICES

CROSS-REFERENCE TO RELATED APPLICATIONS

This application claims priority to and the benefit of U.S. Provisional Application Ser. No. 61/972,703, entitled "Predictive Load Scaling for Services", filed on Mar. 31, 2014, which application is incorporated by reference herein in its entirety.

BACKGROUND

Cloud services are widely used to provide many types of functionality including hosting applications, providing access to data storage, providing web sites, email or other functionality. Cloud services typically run on a network of computer systems that may be located remotely to each other. The computer network may be configured to provide the various services using virtual machines. The services may be scaled by adding or removing virtual machines as needed. For instance, at times of peak load, additional virtual machines may be instantiated, while at times of reduced load, virtual machines may be shut down. These virtual machines are typically either brought up or taken down in a reactionary manner (i.e. reacting to current load), or are managed based on historical load data.

BRIEF SUMMARY

Embodiments described herein are directed to determining an optimal number of concurrently running cloud resource instances and to providing an interactive interface that shows projected operational metric measurements. In one embodiment, a computer system accesses metric information which identifies operational metric measurements for cloud resource instances over a first period of time prior to a present time. The computer system then accesses a second portion of metric information that identifies operational metric measurements for the cloud resource instances over a second period of time, where the second period of time is a period of time that occurred in the past but which corresponds to a specified future period of time. The computer system then calculates projected operational metric measurements based on the identified operational metric measurements over the first period of time (e.g. for reactive tuning) and further based on the identified operational metric measurements over the second period of time (e.g. for predictive tuning). The computer system then determines, based on the projected operational metric measurements, a number of cloud resource instances that are to be concurrently running at a specified future point in time.

In another embodiment, a computer system provides an interactive interface that shows projected operational metric measurements. The computer system accesses operational metric measurement data over a specified time period. The computer system calculates projected operational metric measurements based on the accessed operational metric measurements and determines, based on the projected operational metric measurements, a number of cloud resource instances that are to be concurrently running at specified future points in time. The computer system then provides an interactive interface that displays the determined number of cloud resource instances that are to be concurrently running at the specified points in time. The interactive interface further allows input that changes operational metric settings and dynamically updates the determined number of concurrently running cloud resource instances.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to determining an optimal number of concurrently running cloud resource instances and to providing an interactive interface that shows projected operational metric measurements. In one embodiment, a computer system accesses metric information which identifies operational metric measurements for cloud resource instances over a first period of time prior to a present time. The computer system then accesses a second portion of metric information that identifies operational metric measurements for the cloud resource instances over a second period of time, where the second period of time is a period of time that occurred in the past but which corresponds to a specified future period of time. The computer system then calculates projected operational metric measurements based on the identified operational metric measurements over the first period of time (e.g. for reactive tuning) and further based on the identified operational metric measurements over the second period of time (e.g. for predictive tuning). The computer system then determines, based on the projected operational metric measurements, a number of cloud resource instances that are to be concurrently running at a specified future point in time.

In another embodiment, a computer system provides an interactive interface that shows projected operational metric measurements. The computer system accesses operational metric measurement data over a specified time period. The computer system calculates projected operational metric measurements based on the accessed operational metric measurements and determines, based on the projected operational metric measurements, a number of cloud resource instances that are to be concurrently running at specified future points in time. The computer system then provides an interactive interface that displays the determined number of cloud resource instances that are to be concurrently running at the specified points in time. The interactive interface further allows input that changes operational metric settings and dynamically updates the determined number of concurrently running cloud resource instances.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
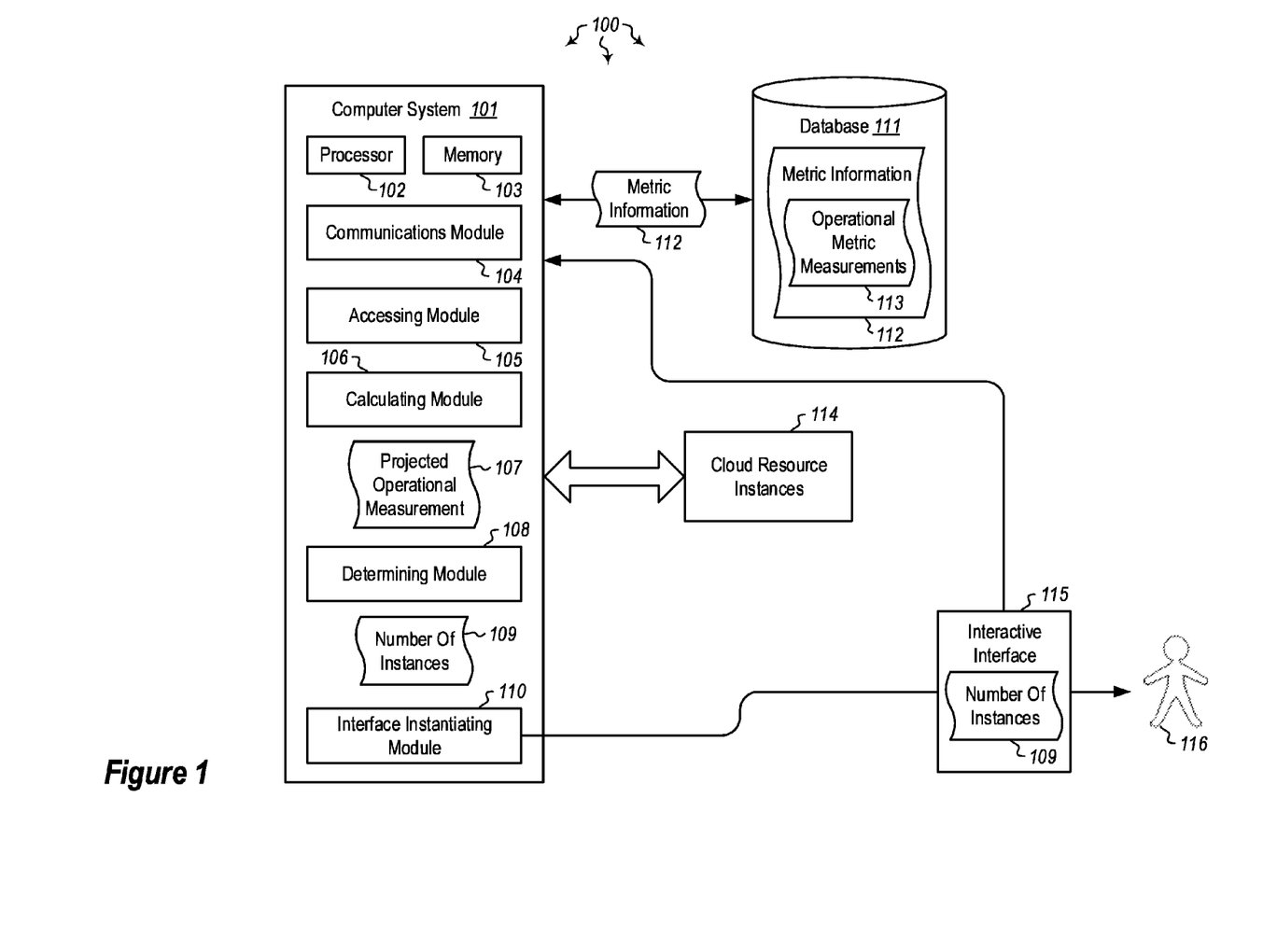
FIG. 1 illustrates a computer architecture in which embodiments described herein may operate including determining an optimal number of concurrently running cloud resource instances.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The computing module 104 may include any wired or wireless communication means that can receive and/or transmit data to or from other computing systems. The communications module 104 may be configured to interact with databases, mobile computing devices (such as mobile phones or tablets), embedded or other types of computing systems.

In some embodiments, the communications module 104 of computer system 101 may be configured to receive metric information from database 111. The database 111 may be any type of local or distributed database, and the data stored within the database may be stored according to substantially any open or proprietary data storage standard. The metric information 112 may include various operational metric measurements 113 for different cloud resources. For example, the metric information may include central processing unit (CPU) load over a period of time. This may be general CPU load or CPU load that is specific to the hosting of a given service or virtual machine. Other metric information may be related to memory, networking bandwidth, number of concurrently running virtual machines, number of CPU cores or any other cloud resource. These cloud resources 114 may be monitored by the computer system 101 over time, and the information identified from the monitoring may be stored as metric information 112.

The accessing module 105 of computer system 101 may be configured to access the metric information using a wired or wireless connection to the database 111 (in some cases, it should be noted, the database 111 may be local to computer system 101). Once the metric information 112 has been accessed, the calculating module of computer system 101 may calculate a projected operational measurement 107. This projected value may be an approximation or projection of what the CPU load or other resource will be consuming at some point in the future. Such a projection may be used to determine how much hardware to have available for scaling on a given day or week or month, etc. For example, many websites encounter a large number of guests on or near the holidays in November and December. In such cases, it may be desirable to know how much hardware to have available to scale up to be able to handle the increase in users. In embodiments herein, this projected operational measurement 107 may be based on past load over certain periods of time. This will be explained in greater detail below.

The determining module 108 of computer system 101 may use the projected operational measurement 107 to determine an optimal number 109 of cloud resource instances 114 (which includes virtual resources (e.g. VM instances) and/or physical resources (e.g. CPUs or network ports)). This determined optimal number of instances 109 may be provided to the interface instantiating module 110 which instantiates interactive interface 115. The interactive interface 115 displays the optimal number of instances 109 for a given period of time. A user 116 may be able to view the number of instances 109 in context with other settings, such as settings that govern how a service is to be hosted. The user may interact with the interface 115 to change certain hosting settings and view an updated projection 107 of cloud resources that should be available if those hosting settings are used. In this manner, a user 116 may be able to make virtual changes to the hosting settings of an application and view the impact to existing cloud resources 114 if those changes were actually to be applied.

In some embodiments described herein, computing system 101 is designed to determine the optimal or ideal number of cloud instances (e.g. concurrently running virtual machines) that the user 116 should have at any given point in time. This determination may be made by looking at previous time windows of the load on the cloud resources (perhaps in relation to a given service), based on known recurring patterns such as daily patterns (e.g. previous days in the week may have similar load at similar times of the day), weekly patterns (e.g. the same day and time in a previous week likely has similar load characteristics) or annual patterns (e.g. there may be some broader patterns, such as the school year or the holiday season).

As determination of optimal cloud resources is being made, it may be beneficial to discount historical data the older it gets. The load of a cloud resource or service over a month ago could be very different from the load of last week. The interactive interface 115 may be configured to show to the user 116 time-series data of the performance of a service, an application, a specified cloud resource or any combination thereof. This data may include the number of instances hosting the service and may further include the aggregate load on the service or cloud resource. Thus, unlike typical metrics, this not the average across all of the cloud resource instances, but instead sums or aggregates the load metrics across all of the instances in the system. The data further includes a projected instance count (i.e. 109), based on the aggregate load, the user-defined hosting settings and any prediction logic.

The projected instance count 109 may be used in multiple ways. When the user 116 views the interactive interface 115, it shows them what scaling should have done at a given point in time. In addition, as the user 116 changes the hosting settings for their service, they can see a live preview that the changes would have on the service, without having to commit and wait for those changes to take effect. This live preview is based on the historical data (i.e. the predictive side of the logic), as future data is obviously not yet available. Additionally, this information, along with the total effects of the new user-defined settings, may be presented to the user 116 as aggregate statistics.

In some embodiments, an optimal number of cloud resource instances 114 may be determined or predicted by looking at usage patterns, and specifically at weekly patterns, as opposed to monthly or daily patterns. These weekly patterns may be the most common patterns, and may be universal across all (or most) services. That said, the same logic could be applied to different periods of time (e.g. monthly or yearly). The time period may even be user-customizable such that the user can select certain hours, days, weeks, etc. over which to view cloud resource load.

As used herein, the term "auto-scaling" refers to automatically scaling a cloud resource (e.g. the number of VMs currently running to host a service, or the size of a particular VM hosting a service) up or down based on current need. When an auto-scaling job is initiated, it may initially look at the previous hour's load. This is a reactive aspect of auto scaling, and, at least in some cases, scale up decisions made by looking at the past hour may be prioritized over any other decisions. This may be done to err on the side of better performance as opposed to cost savings, as users are typically more impacted by bad performance than by a small difference in cost savings.

Figure 4:
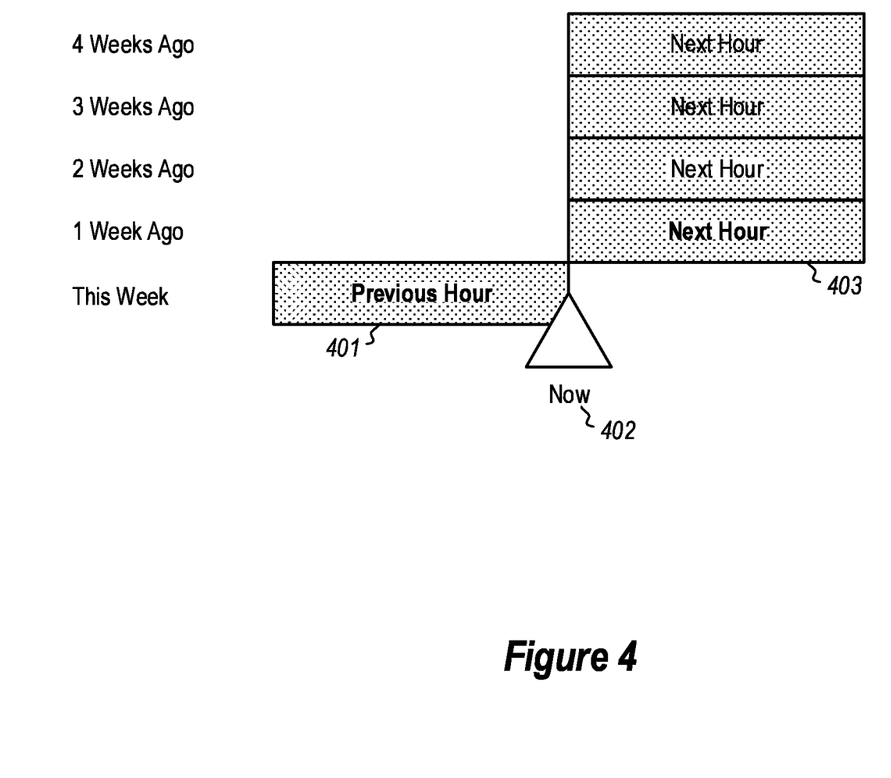
FIG. 4 illustrates an embodiment of a time window for scale-up evaluation.

Thus, as shown in FIG. 4, the first time window considered when determining or predicting future use, may be the previous hour 401. Next, the system may look at what the projected usage is for the next hour. This is calculated by looking at what happened over the next 60 minutes in previous weeks, with an increasing discount the further back we go. For example, if the current time is 1 pm (402), then the previous hour 401 would be noon-1 pm and the next hour 403 would be the usage between 1 pm and 2 pm a week ago, two weeks ago, three weeks ago, and so on. Each previous week may be rated at a different level. For example, the past week may be weighted at 0.5, two weeks ago at 0.25, three weeks ago at 0.125, and so on. By combining these values together, the system can determine a single projected CPU value for the upcoming hour. If the cloud resource load is above the threshold that the user has defined, then a scale up action may take place.

Next, scale-down conditions may be evaluated. For scale-down, computer system 101 may be configured to only look at the previous hour (or other time increment). This ensures that we don't erroneously scale down just because last week there wasn't a load at that time. In one embodiment, the system may scale down only if current usage and historical usage are both sufficiently low. This is a more aggressive approach to keeping performance high and optimizing performance over cost savings.

In other embodiments, a timeline may be shown that indicates what would have happened had an auto-scaling feature been enabled. Initially, two different time series of data may be stored: instance count and auto-scale status. Both may be accomplished by having a regular job that emits the state of the system at certain time increments (e.g. every five minutes). This information may then be used to calculate two separate lines as shown in the projected instance count 501 of FIG. 5: auto-scaled instance count and non-auto-scaled instance count. The dotted line is zero for all data points where auto-scale is off, and is equal to the instance count where auto-scale is on. The other (solid) line is the opposite: it is zero when auto-scale is on and the instance count when auto-scale is off.

The aggregate load is also based on the time-series data of metrics reported from the users' system. In some embodiments, the default metric is CPU usage, but it can be any metric that the user selects or defines. There are two types of metrics: percentage and absolute. For each percentage data point, the system takes the aggregate metric and multiplies by the number of instances that are running at that point in time. Absolute data points are treated a little differently, as they are not normalized to a certain threshold (e.g. 100%). Accordingly, in such cases, the system first divides by the maximum target that the user has defined, and then multiplies by the number of instances. The projected instance count may be calculated by running an auto-scale engine over the instance count at each data point. For example, if the user 116 has indicated that they should scale up when CPU is above 60%, then the projected instance count will be the aggregate CPU load divided by 0.6. As such, this line changes as the user adjusts the auto-scale settings. This allows the user to preview the effect that a new set of options would have on the performance, as well as show the cost of applying those settings.

Additionally, the interactive interface 115 may be configured to show to the user rolled up statistics on the overall success of proactive auto-scale. The aggregate statistics may include two values: cost without auto-scale and cost with auto-scale. Cost without is calculated by multiplying the non-auto-scaled instance count by the per-unit cost of the virtual machines. If there is no data point for the non-auto-scale instance cost, the maximum of the instance count line is used to fill in the data. The cost with auto-scale is calculated by multiplying the projected instance count by the per-unit cost of the virtual machines. These concepts will be explained further below with regard to methods 200 and 300 of FIGS. 2 and 3, respectively.

Figure 2:
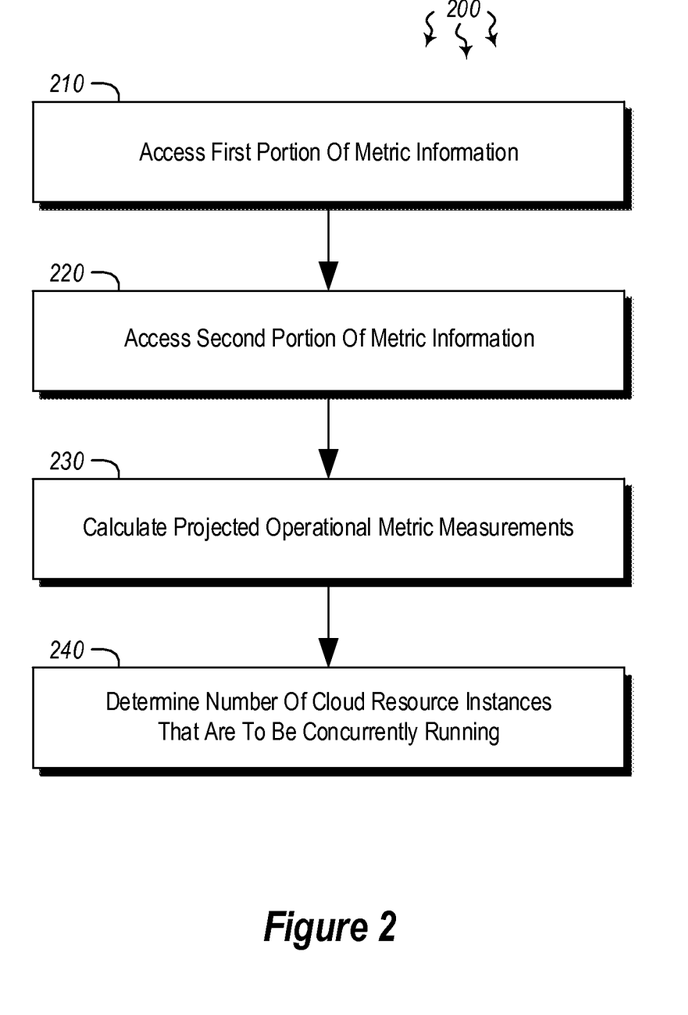
FIG. 2 illustrates a flowchart of an example method for determining an optimal number of concurrently running cloud resource instances.
Figure 3:
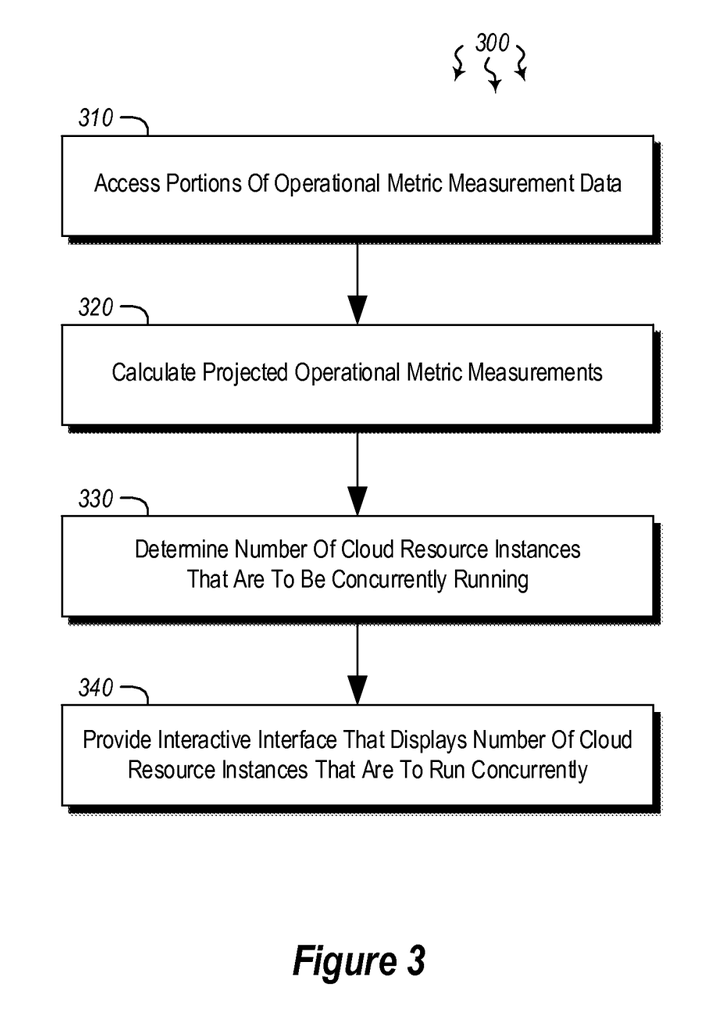
FIG. 3 illustrates a flowchart of an example method for providing an interactive interface that shows projected operational metric measurements.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining an optimal number of concurrently running cloud resource instances. The method 200 will now be described with frequent reference to the components and data of environment 100.

Method 200 includes an act of accessing a first portion of metric information which identifies operational metric measurements for one or more cloud resource instances over a first period of time prior to a present time (act 210). For example, accessing module 105 of computer system 101 may access metric information 112 which includes operational metric measurements 113 for various cloud resource instances 114. The metric information 112 may include metric information for the prior hour, for example. Thus, as shown in FIG. 4, the metric information may correspond to the CPU load or other measurement over the previous hour 401.

Method 200 includes an act of accessing a second portion of metric information that identifies operational metric measurements for the one or more cloud resource instances over at least a second period of time, the second period of time comprising a period of time that occurred in the past but which corresponds to a specified future period of time (act 220). The accessing module 105 of computer system 101 may access another portion of metric information 112 that shows various operational characteristics of one or more cloud resource instances over a period of time. The period of time may correspond to a period that occurred in the past but which corresponds to a future period of time. Thus, if the current time is 10 am (e.g. 402 in FIG. 4) on Tuesday, April 8th, the previous hour (401) would have been from 9 am-10 am, while the next hour 403 would correspond to the hour from 10 am-11 am, but one week (or two or three weeks) displaced. Thus, the period of time is said to have occurred in the past (e.g. on Tuesday, April 1st, from 10 am-11 am), but corresponds to the future period of time Tuesday, April 8th, from 10 am-11 m.

This second period of time may be selected or customized by a user. The second period of time (403) is used for predicting future load (or other measurement), while the first period of time (401) is used for reacting to past load (in most cases, in the very recent past). As indicated, the second period of time may be specified by user 116 and may be a day, a week, a month a year, or some other specified timeframe (e.g. a weekend, six months, an hour and twelve minutes, etc.). Older operational metric measurements may be weighted progressively less than newer operational metric measurements. Thus, second time periods 403 that correspond to a time that occurred in the past but also correspond to a future time may each be weighted progressively less for each older operational measurement. Thus, in some embodiments, those operational metric measurements 113 that are identified over the first period of time 401 are prioritized over the identified operational metric measurements of the second period of time 403 when calculating the projected operational metric measurements 107. This prioritization may lead to performance of a hosted service being prioritized over potential cost savings that could be realized if a certain number of cloud resources (e.g. VMs) were scaled down in an auto-scale operation.

Method 200 next includes an act of calculating one or more projected operational metric measurements based on the identified operational metric measurements over the first period of time and further based on the identified operational metric measurements over the second period of time (predictive tuning) (act 230). For example, calculating module 106 of computer system 101 may calculate projected operational metric measurements 107 based on the identified operational metric measurements 113 over the first period of time (e.g. 401) (reactive tuning) and further based on the identified operational metric measurements over the second period of time (predictive tuning) (e.g. 403). In some cases, current operational metric measurements may also be taken into account (e.g. at 402). The measurements over the first period of time (i.e. the recent past) may be used for reactive tuning or reactive auto-scaling, which is scaling cloud resource instances up or down to match the demand. If demand has been high for the past hour, it is likely that demand will continue to be high for the next hour (at least during a workday). Similarly, if demand has been low, it is more likely than not that the next hour will remain at low demand (at least during the night time).

However, transitions may occur more quickly, for example, if a website is offering a midnight deal, demand may change greatly from the load seen over the previous 11 pm-12 am hour. Similarly, traffic may increase for a service that provides applications used by workers. Demand may go up substantially in the morning and may drop substantially in the evening when workers go home. Accordingly, the calculating module 106 may look not only at the recent past, but may also look at what happened in the next hour (or other timeframe) in the past (e.g. what happened in the next hour, one day ago, or one week ago). In this manner, the calculating module 106 can provide a projected operational measurement 107 that includes a reactive measurement and a predictive measurement.

The determining module 108 may then determine, based on the projected operational metric measurements 107, a number of cloud resource instances 109 that are to be concurrently running at one or more specified future points in time (act 240). The determined number of instances 109 may specify how many virtual machines, or how many CPU cores, or how many network ports or how many other cloud resource instances 114 are to be running to handle the load predicted in the projected operational measurement 107. The projected operational measurement 107 may be more accurate than other methods, as it includes the identified operational metric measurements over the first period of time (i.e. the reactive measurements) and the identified operational metric measurements over the second period of time (i.e. the predictive measurements). In some cases, there may be conflicting data between the measurements of the past hour (which may be high) and the measurements of the approaching hour, one or two weeks ago (which may indicate that load will be low). In such cases, cloud resource scaling actions may give deference to the load measured over the prior hour (401) over the load measured over periods of time that are farther back. At least in some cases, however, this may be a configurable setting, and a user or administrator may establish a policy to determine which measurements are given deference.

If the determining module 108 determines that a specified number of virtual machine instances are to be concurrently running, and the number of currently running virtual machine instances is (substantially) lower or higher than the determined number 109, the determining module may trigger an auto-scaling action. Thus, if the determined number of instances 109 is, for example, five, and the number of currently running VM instances is 8, an auto-scaling action may occur which reduces the number of concurrently running VM instances to five. The auto-scaling action may include adding or removing VM instances, and may be performed repeatedly as determined by the determining module 109 and as the projected operational measurement 107 changes.

In some embodiments, virtual machine instances may only be removed upon determining that the removal would not trigger other auto-scaling actions, so as to prevent flapping (where one auto-scaling rule indicates that instances are to be added and, once added, a second auto-scaling rule indicates that the newly added instances are to be removed). Policies may be implemented which specify that auto-scaling actions are prevented from removing VM instances. This prioritizes health over resource savings, as VM instances are not scaled down even in times of reduced load. Auto-scaling actions may further be configured to increase or decrease the size one or more currently running virtual machine instances, instead of powering down or powering up new ones. Increasing the size may include increasing the number of available CPUs, CPU cores, memory, storage, networking capacity or increasing the quantity of other resources. The projections made by the calculating module 106 may be displayed in an interactive interface 115, as will be explained further below with regard to method 300 of FIG. 3.

FIG. 3 illustrates a flowchart of a method 300 for providing an interactive interface that shows projected operational metric measurements. The method 300 will now be described with frequent reference to the components and data of environment 100.

Method 300 includes an act of accessing one or more portions of operational metric measurement data over at least one time period (act 310). For example, accessing module 105 of computer system 101 may access operational metric measurement data 113 that includes metric data for one or more cloud resources over a period of time. The calculating module 106 of computer system 101 may then calculate one or more projected operational metric measurements 107 based on the accessed operational metric measurements (act 320). In this calculation, reactive and/or predictive calculations may be used. The determining module 108 may then determine, based on the projected operational metric measurements 107, a number of cloud resource instances that are to be concurrently running at one or more specified future points in time (act 330). The interface instantiating module 110 may then instantiate an interactive interface 115 that displays the determined number of cloud resource instances 109 that are to be concurrently running at the one or more specified points in time. The interactive interface further allows input (e.g. from user 116) that changes operational metric hosting or auto-scale settings and dynamically updates the determined number of concurrently running cloud resource instances (act 340).

Figure 6:
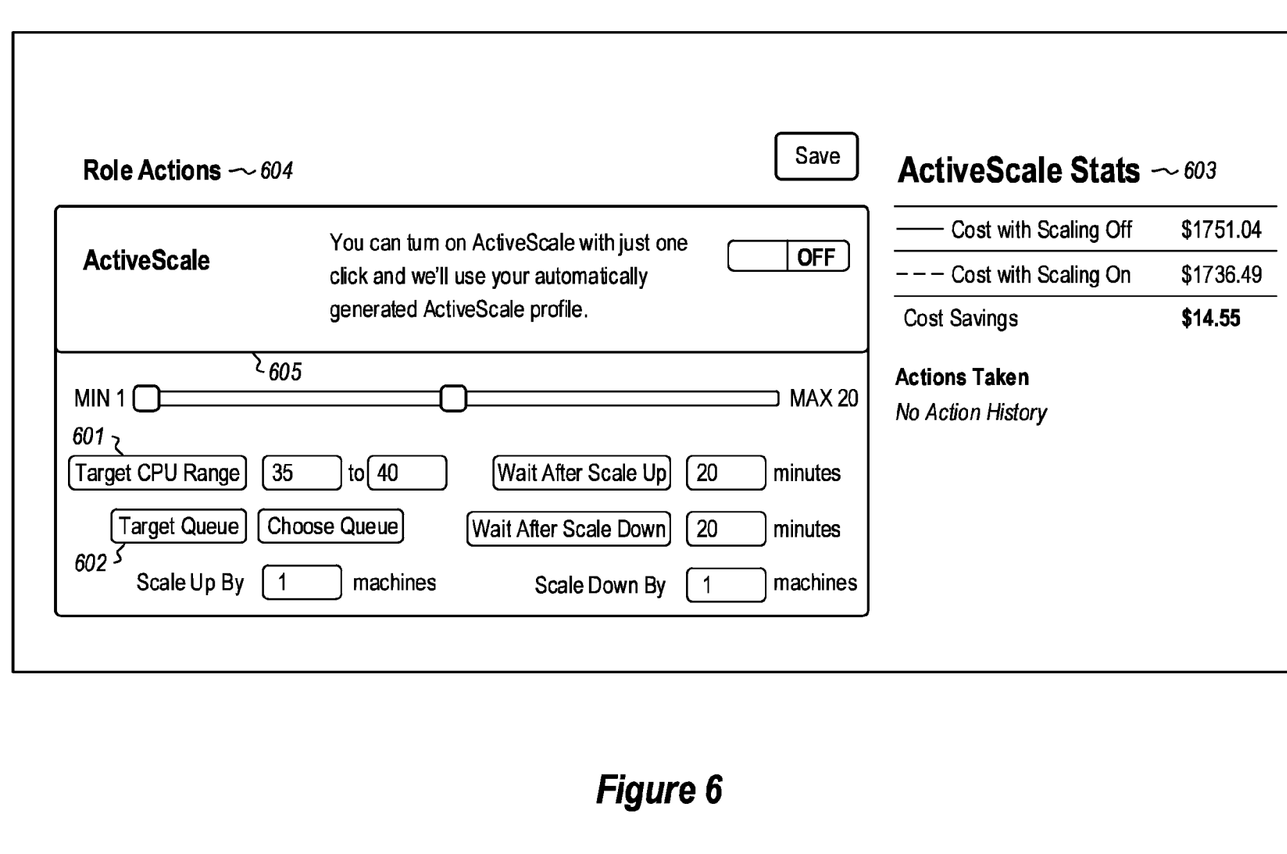
FIG. 6 illustrates an embodiment of an interactive interface that displays an impact preview.

For example, as shown in FIG. 6, a user may specify different actions 604 that are to occur or different metric settings that are to be maintained when hosting a service or otherwise using cloud resources. The user may specify a target CPU load range 601 that is to be maintained for each CPU, or may specify a target queue 602, or time to wait after scaling up or down. The user may turn auto-scaling on or off using switch 605, and may view the projected statistics or measurements at 603. The statistics may include an indication of the cost to run the cloud resources with auto-scaling on and with auto-scaling turned off.

Figure 5:
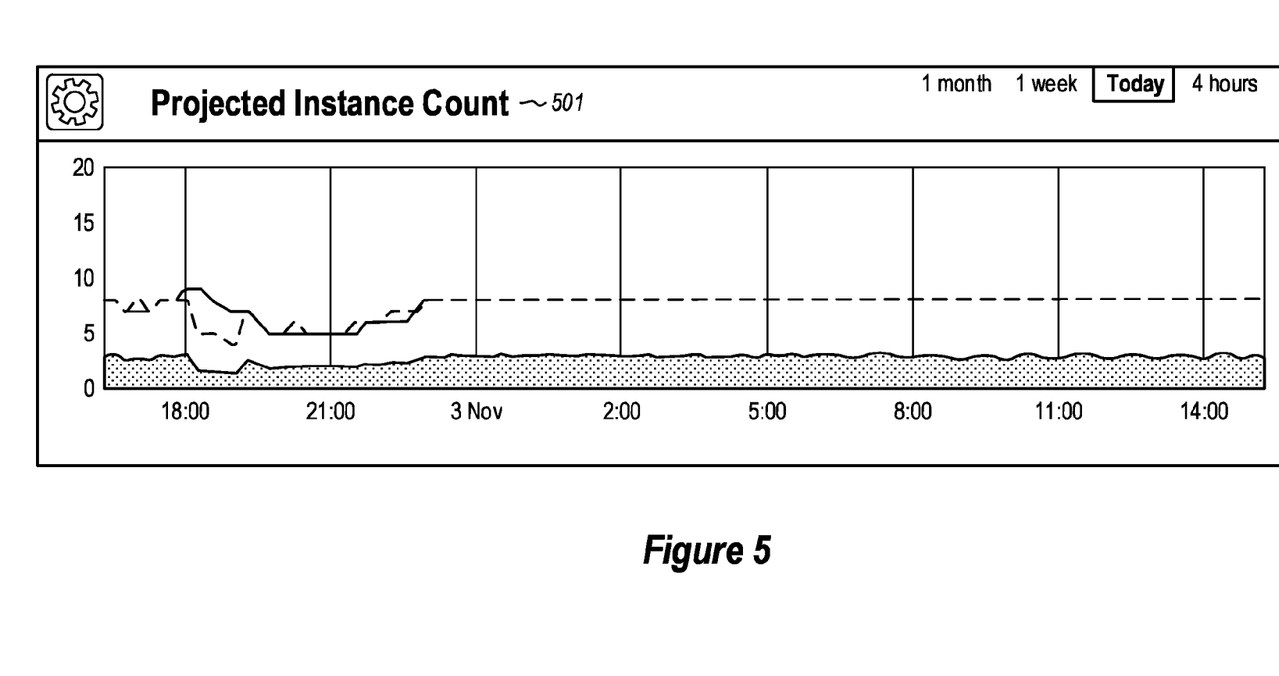
FIG. 5 illustrates an embodiment of an interactive interface that displays a projected instance count.

The interactive interface may also show historical operational metric measurement data for a specified time period (i.e. what actually happened during that timeframe) and further show an indication of the number of virtual machine instances that would have been concurrently running had auto-scaling been applied during the time period (as shown in FIG. 5 where the dotted line shows the number had auto-scaling been on, while the solid line shows the actual measurements. Accordingly, it can be seen in FIG. 5 that had auto-scaling been on between the period of 6 pm and 9 pm, the number of concurrently running instances would have dropped, leading to a cost savings. Accordingly, users may use the interactive interface to see what actually happened, what would have happened had auto-scaling been turned on, and what would happen if certain settings were applied to the cloud resource(s).

In some embodiments, the interactive interface 115 provides an indication that an auto-scaling action has been triggered based on the determined number of virtual machine instances that are to be concurrently running. As mentioned above, these auto-scaling actions may take place when the determining module 108 determines that a certain number of virtual machine instances 109 are to be concurrently running. If more or fewer than that determined number are currently running, the computer system 101 triggers an auto-scaling action. Each time one of these auto-scaling actions occurs, the user 116 may be apprised in the interactive interface 115. The user may use this information to change settings if, for example, auto-scaling actions are taking place too often. The interactive interface may further provide an option to choose which virtual machine instances are removed during an auto-scaling action. There may be situations where a user would like certain VM instances removed in a scale-down or certain VM instances added in a scale-up. Accordingly, the user may make such specifications using the interactive interface. Options may also be provided which allow the user to select a new size for those virtual machine instances that are to be changed during an auto-scaling action Accordingly, methods, systems and computer program products are provided which determine an optimal number of cloud resource instances that should be concurrently running at any given point in time. Moreover, methods, systems and computer program products are provided which provide an interactive interface that shows current and projected operational metric measurements.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor and a memory, a computer-implemented method for determining an optimal number of concurrently running cloud resource instances, the method comprising:

an act of accessing a first portion of metric information that identifies first operational metric measurements for one or more cloud resource instances over a first period of time prior to a present time, wherein the first period of time is a contiguous time period;

an act of accessing a second portion of metric information that identifies second operational metric measurements for the one or more cloud resource instances over at least a second period of time, the second period of time comprising one or more discrete periods of time that occurred in the past, the second period of time also corresponding to one or more specified future periods of time;

an act of calculating one or more projected operational metric measurements based on the identified operational metric measurements over the first period of time and further based on the identified operational metric measurements over the second period of time; and an act of determining, based on the one or more projected operational metric measurements, a number of cloud resource instances that are to be concurrently running at the one or more specified future periods of time; and based on at least the one or more projected operational metric measurements, an act of scaling the concurrently running cloud resource instances during at least one of the one or more specified future points in time.

2. The method of claim 1, wherein the identified operational metric measurements over the first period of time are prioritized over the identified operational metric measurements of the second period of time when calculating the one or more projected operational metric measurements.

3. The method of claim 1, wherein the second period of time is specified by a user and comprises at least one of a day, a week, a month or a year.

4. The method of claim 3, wherein older operational metric measurements are weighted progressively less than newer operational metric measurements.

5. The method of claim 1, wherein the projected operational metric measurements based on the identified operational metric measurements over the first period of time comprise reactive measurements while the projected operational metric measurements based on the identified operational metric measurements over the second period of time comprise predictive measurements.

6. The method of claim 1, wherein determining a number of virtual machine instances that are to be concurrently running triggers an auto-scaling action if the number of concurrently running virtual machine instances is more or less than the determined number.

7. The method of claim 6, wherein the auto-scaling action comprises adding at least one virtual machine instance.

8. The method of claim 6, wherein the auto-scaling action comprises removing at least one virtual machine instance.

9. The method of claim 8, wherein virtual machine instances are removed upon determining that the removal would not trigger other auto-scaling actions.

10. The method of claim 6, wherein auto-scaling actions are prevented from removing virtual machine instances to prioritize health over resource savings.

11. The method of claim 6, wherein the auto-scaling action comprises increasing or decreasing the size of at least one currently running virtual machine instance.

12. A computer program product for implementing a method for providing an interactive interface that shows projected operational metric measurements, the computer program product comprising one or more computer-readable hardware storage media having stored thereon computer-executable instructions that, when executed by one or more processors of a computing system, cause the computing system to perform the method, the method comprising:

accessing a first portion of metric measurement data that identifies first operational metric measurements for one or more cloud resource instances over a first time period prior to a present time, wherein the first time period is a single, contiguous time period;

accessing a second portion of metric information that identifies second operational metric measurements for the one or more cloud resource instances over at least a second period of time, the second period of time comprising one or more discrete periods of time that occurred in the past, the second period of time also corresponding to one or more specified future periods of time;

calculating one or more projected operational metric measurements based on both the accessed operational metric measurements over the first time period and the second time period;

determining, based on the one or more projected operational metric measurements, a number of cloud resource instances that are to be concurrently running at the one or more specified future periods of time; and providing an interactive interface that displays the determined number of cloud resource instances that are to be concurrently running at the one or more specified periods of time, the interactive interface further allowing input that changes operational metric settings and dynamically updates the number of concurrently running cloud resource instances.

13. The computer program product of claim 12, wherein the interactive interface show historical operational metric measurement data for a time period and an indication of the number of virtual machine instances that would have been concurrently running had auto-scaling been applied during the time period.

14. The computer program product of claim 13, wherein the interactive interface further shows a cost savings for the time period had auto-scaling been applied during that time period.

15. The computer program product of claim 12, wherein the interactive interface provides an indication that an auto-scaling action has been triggered based on the determined number of virtual machine instances that are to be concurrently running.

16. The computer program product of claim 15, wherein the interactive interface provides an option to choose which virtual machine instances are removed during an auto-scaling action.

17. The computer program product of claim 16, wherein the interactive interface provides an option to select a new size for those virtual machine instances that are to be changed during an auto-scaling action.

18. A computer system comprising the following:
one or more processors;
system memory;
one or more computer-readable storage media having stored thereon computer-executable instructions that, when executed by the one or more processors, cause the computing system to perform a method for determining an optimal number of concurrently running virtual machine instances, the method comprising the following:

accessing a first portion of metric information that identifies first operational metric measurements for one or more virtual machine instances over a first period of time prior to a present time, wherein the first period of time is a contiguous time period;

accessing a second portion of metric information that identifies second operational metric measurements for the one or more virtual machine instances over at least a second period of time, the second period of time comprising a plurality of discrete periods of time that occurred in the past, the second period of time also corresponding to one or more specified future periods of time;

calculating one or more projected operational metric measurements based on the identified operational metric measurements over the first period of time and further based on the identified operational metric measurements over the second period of time; and determining, based on the one or more projected operational metric measurements, a number of virtual machine instances that are to be concurrently running at the one or more specified future periods of time;

based on at least the one or more projected operational metric measurements, an act of scaling the concurrently running cloud resource instances during at least one of the one or more specified future periods of time.

19. The computer system of claim 18, wherein determining a number of virtual machine instances that are to be concurrently running triggers an auto-scaling action if the number of concurrently running virtual machine instances is more or less than the determined number.

20. The computer system of claim 18, wherein the auto-scaling action is automatically performed upon determining that a second, different auto-scaling action would not be triggered.

* * * * *